United States Patent
Schramm et al.

(10) Patent No.: US 11,880,004 B2
(45) Date of Patent: Jan. 23, 2024

(54) METHOD FOR DETERMINING THE QUALITY OF AN IMAGING PLATE AND IMAGING PLATE SCANNER THEREFOR

(71) Applicant: Dürr Dental SE, Bietigheim-Bissingen (DE)

(72) Inventors: Axel Schramm, Ilsfeld (DE); Matthias Beck, Löschgau (DE); Bernd Philipps, Untergruppenbach (DE); Michael Weber, Burgstetten (DE); Herbert Häntsch, Beilstein (DE); Alexander Ladikos, Eching (DE)

(73) Assignee: DÜRR DENTAL SE, Bietigheim-Bissingen (DE)

( * ) Notice: Subject to any disclaimer, the term of this patent is extended or adjusted under 35 U.S.C. 154(b) by 458 days.

(21) Appl. No.: 16/647,447

(22) PCT Filed: Sep. 13, 2018

(86) PCT No.: PCT/EP2018/074830
§ 371 (c)(1),
(2) Date: Mar. 13, 2020

(87) PCT Pub. No.: WO2019/053171
PCT Pub. Date: Mar. 21, 2019

(65) Prior Publication Data
US 2020/0278459 A1    Sep. 3, 2020

(30) Foreign Application Priority Data
Sep. 14, 2017 (DE) .................... 10 2017 121 338.4

(51) Int. Cl.
G06T 7/00 (2017.01)
G06T 7/13 (2017.01)
G01T 1/20 (2006.01)

(52) U.S. Cl.
CPC .......... *G01T 1/2014* (2013.01); *G06T 7/0004* (2013.01); *G06T 7/13* (2017.01); *G06T 2207/30168* (2013.01)

(58) Field of Classification Search
None
See application file for complete search history.

(56) References Cited

U.S. PATENT DOCUMENTS

| 5,420,441 A | 5/1995 | Newman et al. |
| 2005/0162178 A1 | 7/2005 | Steele et al. |

(Continued)

FOREIGN PATENT DOCUMENTS

| CN | 1540325 A | 10/2004 |
| CN | 101069092 | 11/2007 |

(Continued)

OTHER PUBLICATIONS

Office Action for Chinese Patent Application No. 2018800599508, dated Mar. 26, 2021, 13 pages (including English translation).

(Continued)

*Primary Examiner* — David P Porta
*Assistant Examiner* — Carolyn Fin
(74) *Attorney, Agent, or Firm* — Chiesa Shahinian & Giantomasi PC

(57) ABSTRACT

The invention relates to a method for determining the quality of an imaging plate, comprising the steps of carrying out an exposure of the imaging plate, carrying out a scan of the imaging plate in order to determine an image, determining a signal-to-noise ratio of the image or/and carrying out edge recognition on the image and calculating a quality value of the imaging plate on the basis of the signal-to-noise ratio of the image or/and on the basis of the recognized edge structure. Furthermore, the invention relates to an imaging plate scanner for carrying out such a method.

20 Claims, 5 Drawing Sheets

(56) References Cited

U.S. PATENT DOCUMENTS

2010/0266187 A1 10/2010 Crucs
2013/0121467 A1 5/2013 Cresens et al.

FOREIGN PATENT DOCUMENTS

CN 103576165 2/2014
TW M300413 U 11/2006

OTHER PUBLICATIONS

German Examination Report, Request for Search Under Sec. 43 Patent Law for German Patent Application No. DE 10 2017 121 338.4, dated May 28, 2018, 12 pages (including English translation).
PCT International Search Report for International Application No. PCT/EP2018/074830, dated Nov. 29, 2018, 14 pages including English translation).
O Rampado et al., "Quantitative Assessment of Computed Radiography Quality Control Parameters", Mar. 2, 2006, 18 pages, United Kingdom.
Aikaterini-Lampro N. Salvara et al., "Digital Radiographic Systems Quality Control Procedures", Jun. 3, 2011, 14 pages, Athens, Greece.
Ian D. Honey et al., "Artifacts Found During Quality Assurance Testing of Computed Radiography and Digital Radiography Detectors", vol. 22 No. 4, Aug. 2009, 10 pages.
Zeljko Hocenski et al., "Improved Canny Edge Detector in Ceramic Tiles Defect Detection", 2006, 4 pages.
Laura Mascio Kegelmeyer et al., "Local Area Signal-to-Noise Ratio (LASNR) Algorithm for Image Segmentation", Sep. 24, 2007, 10 pages, San Diego, California.
Chinese Second Office Action for Chinese Patent Application No. CN 201880059950, dated Feb. 7, 2022, 16 pages (including English translation).
Chinese Third Office Action for Chinese Patent Application No. CN 2018800599508, dated Sep. 7, 2022, 15 pages (including English translation).
Japanese Final Rejection for Japanese Patent Application No. 2020-537038, dated Mar. 20, 2023, 11 pages (including English translation).

METHOD FOR DETERMINING THE QUALITY OF AN IMAGING PLATE AND IMAGING PLATE SCANNER THEREFOR

CROSS-REFERENCE TO RELATED APPLICATIONS

This patent application is a U.S. National Stage Patent Application under 35 U.S.C. 371 of International Patent Application No. PCT/EP2018/074830 filed Sep. 13, 2018, which claims priority to and the benefit of German Patent Application No. 10 2017 121 338.4 filed Sep. 14, 2017, all of which are hereby incorporated by reference in their entirety.

BACKGROUND OF THE INVENTION

1. Field of the Invention

The invention relates to a method for determining the quality of an imaging plate and imaging plate scanner therefor.

2. Description of the Prior Art

In X-ray technology, in particular in medical X-ray technology appertaining to dentistry, imaging plates are used nowadays for recording X-ray images. Said imaging plates comprise a phosphor material embedded in a transparent matrix. As a result, so-called storage centers arise, which can be brought to excited metastable states by incident X-ray light. If such an imaging plate is exposed in an X-ray apparatus, for example for recording a bitewing of a patient, the imaging plate contains a latent X-ray image in the form of excited and non-excited storage centers.

For the purpose of reading the imaging plate, the latter is scanned point by point with read-out light in a scanning device, as a result of which the metastable states of the excited storage centers are brought to a state which rapidly relaxes with emission of a fluorescent light. Said fluorescent light can be captured with the aid of a detector unit, such that the X-ray image can be made visible using corresponding evaluation electronics. For the reading process, use is made of drum scanners, for example, which guide the imaging plate along a cylindrical surface over a read-out gap.

A major advantage of imaging plate technology consists in the reusability of the imaging plates. Thus, after read-out, in the course of which the image information stored in the plate is erased anyway, an imaging plate can generally be used for many further recording and storage processes. There are various aging processes which impose limits on the reusability. One such limit is constituted by substantially local storage centers which form over the course of time and which can no longer be excited and thus remain dark in the storage image. During operation in practice, mechanical loads can also occur, as a result of which scratches or punctiform instances of damage can occur on the surface of the imaging plate for example as a result of improper handling.

During operation in practice, it is desirable to know the instantaneous storage quality of an imaging plate. In this case, conventionally, the imaging plate can be inspected and the scratches situated on the surface can be assessed with regard to their effect on the recording and reading process. Furthermore, the number of recordings made with the imaging plate can be counted or the lifetime of the imaging plate can be ascertained on the basis of a production date. All these measures, however, do not yield a reliable statement about the actual storage capability of the imaging plate.

SUMMARY OF THE INVENTION

It is an object of the invention to specify a method for determining the quality of an imaging plate which avoids the disadvantages mentioned above and makes it possible, in particular, to make an accurate statement about the storage capability and quality of the imaging plate.

The object is achieved by means of a method as claimed in independent claim 1. The method according to the invention comprises the steps of:

carrying out an exposure of the imaging plate, carrying out a scan of the imaging plate in order to determine an image, determining a signal-to-noise ratio of the image or/and carrying out an edge recognition on the image, and calculating a quality value of the imaging plate on the basis of the signal-to-noise ratio of the image or/and on the basis of the recognized edge structure.

The method according to the invention provides two quality features that can be used alternatively or in combination. One feature is the signal-to-noise ratio mentioned. After an exposure of the imaging plate has been carried out, the signal-to-noise ratio of the image yields an indication as to whether the imaging plate has defects in the sense of non-functional storage centers. If storage centers emit no fluorescent light despite the uniform exposure of the imaging plate during the reading process, the signal-to-noise ratio deteriorates.

The other feature is carrying out an edge recognition. The edge recognition on the image yields indications of possible defects in the same way. In the case of a uniform exposure of the imaging plate, the resulting image should result in a uniform illumination—that is to say a uniform grayscale value. By contrast, if structures are found by means of the edge recognition, this is an indication of possible defects of the imaging plate.

Preferably, exposing the imaging plate is carried out with a specific dose. This facilitates ascertaining the signal-to-noise ratio or carrying out the edge recognition. However, the exposure and the subsequent calculations can also be carried out with the dose not being known. However, the dose used should lie within a dose bandwidth within which the imaging plate is not underexposed and is not overexposed. The dose can be set for example by way of the exposure time, the X-ray voltage and the anode voltage.

One advantageous configuration of the invention provides for the step of carrying out an exposure to comprise setting a specific distance between the plate and a recording device. This facilitates determining the expected absolute grayscale value of the image and thus the reproducibility of the calculation of the quality value of the imaging plate, but is not a necessary prerequisite for successfully carrying out the method. It is merely necessary to ensure that the imaging plate is neither overexposed nor underexposed. In principle, the pair of values of dose and distance should be chosen accordingly. By way of example, a larger distance can be compensated for by a larger dose.

One embodiment of the invention provides for exposing the imaging plate to be carried out in the context of a normal examination. This means that the method of recognizing defects is also able to be carried out on imaging plates which have been exposed on patients, for example, and which therefore contain an image. The evaluation method—that is to say determining the signal-to-noise ratio or/and carrying out an edge recognition—records recognized defects and assigns them to the imaging plate. After repeated use of the imaging plate and after a process of recognizing defects has been carried out anew, defects occurring again can be registered and identified as such. Possible artefacts that occur, such as, for example, as a result of objects opaque to X-rays (for example metal fillings), which are imaged on the recording, can be correspondingly recognized, rated and identified as such.

One further development of the invention provides for determining a signal-to-noise ratio to comprise applying a mask filter. In this case, the mask filter can exclude for example an edge of the imaging plate—for example one or two millimeters—from the calculation of the signal-to-noise ratio. In this case, the edge of the imaging plate can be fixedly predefined or able to be input by an operator. Alternatively or additionally, besides the edge, the mask filter can also exclude other markings of the imaging plate. In this case, the markings can also be recognized by means of morphological operations and be added to the mask filter.

One particularly preferred embodiment of the invention provides for determining the signal-to-noise ratio to comprise determining a local signal-to-noise ratio for one or more segments of the image. By way of example, an array having a size of 21 times 21 pixels can serve as a basis for the calculation of the signal-to-noise ratio. For such an array size, a local signal-to-noise ratio can be calculated on the entire image. An associated signal-to-noise ratio thus results for each pixel of the image (with the exception of an edge strip corresponding to the 21 times 21 pixels). Regions having a low local signal-to-noise ratio correspond to regions which presumably have a defect. By way of example, a threshold value can be defined in this case. The threshold value can be determined for example with the aid of the maximum and minimum values of the locally determined signal-to-noise ratio. For this purpose, by way of example, it is possible to determine the ratio of the signal-to-noise value reduced by the minimum value and the difference between maximum value and minimum value. A pixel can be marked as a defect, for example, if the ratio just described is 0.2 or less, that is to say that the local signal-to-noise ratio is 20% or less of the possible range of values.

Alternatively or additionally, one embodiment can provide for an instance of damage to the imaging plate to be ascertained on the basis of a recognized edge structure. By means of the edge recognition, it is possible to recognize defects—that is to say for example no longer functional storage centers—as structures in the otherwise uniformly exposed plate.

In one preferred embodiment, carrying out an edge recognition comprises using the Canny algorithm. Preferably, before carrying out the edge recognition, blurring or adding unsharpness can be carried out. This reduces the production of artefacts on account of pixels having a high proportion of noise. Furthermore, after carrying out the edge recognition, a threshold value operation can be carried out, preferably in order to obtain a binary image.

In one development of the invention, it can be provided that after carrying out an edge recognition, in particular after carrying out the threshold value operation, a morphological dilatation or/and a closing operation is performed. By means of the morphological dilatation and the closing operation, the visibility of the individual region having irregularities/instances of damage can be improved since, in principle, values having a high grayscale value are increased and values having a low grayscale value are reduced. At the same time, small gaps between such regions can be closed.

One preferred embodiment of the invention provides for the image obtained from the signal-to-noise operation and the image resulting from the edge recognition to be combined by means of a logic OR operation. The quality of the imaging plate can be ascertained on the basis of the resulting total number of marked pixels. In this case, by way of example, the number of thus marked pixels $N_{marked}$ can be converted to a number representing the quality of the imaging plate in accordance with the following formula:

$$f_{marked} = -\ln \frac{N_{marked}}{N_{total} - N_{Mask}}$$

In this case, $f_{marked}$ represents the quality rating of the imaging plate, $N_{marked}$ represents the number of marked image pixels, $N_{total}$ represents the total number of pixels in the image under consideration, and $N_{Mask}$ represents the number of plate edge and marking pixels masked by the exclusion mask. Consequently, an imaging plate with an image having a very low number of marked pixels is given a high rating, while imaging plates whose images have a high number of marked, i.e. erroneous, pixels are given a low rating.

In order to scale the rating thus obtained for an imaging plate in a range of between 0 and 1 and in order to make it possible to adapt the weighting of the individual determined/marked features, the rating $f_{marked}$ can be transformed as follows:

$$f_{final} = w_0 + w_1 f_{marked}$$

This allows the rating thus obtained to be compared with other rating criteria, such as, for example, as a result of optical assessment and subsequent rating of an imaging plate. In this case, by way of example, provision can be made for the parameters $w_0$ and $w_1$ to be chosen by means of a linear regression on a training dataset such that the resulting final value corresponds to an expert rating of the plate quality as well as possible.

BRIEF DESCRIPTION OF THE DRAWINGS

Exemplary embodiments of the invention are explained in greater detail below with reference to the drawings, in which.

DESCRIPTION OF PREFERRED EXEMPLARY EMBODIMENTS

Figure 1:
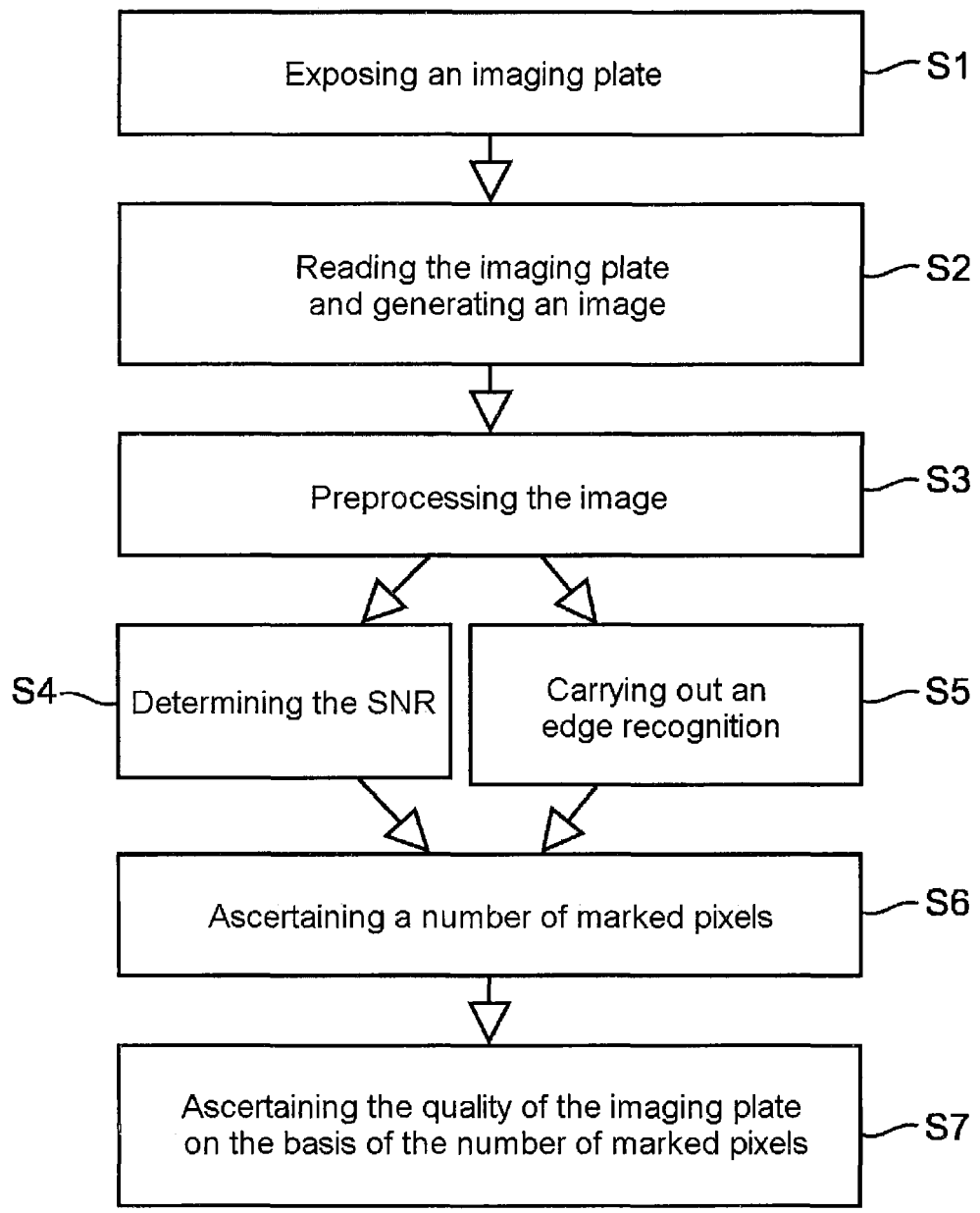
FIG. 1 shows a first embodiment of a method according to the invention in a flow diagram.

FIG. 1 illustrates one exemplary embodiment of a method according to the invention in a simplified schematic flow diagram. The method comprises the step of exposing an imaging plate S1. When exposing the imaging plate, it is advantageous if the imaging plate is exposed with a specific dose. It has proved to be advantageous if the imaging plate is positioned within a predefined distance from the recording device. 12 cm has proved to be worthwhile in practice, which can be set as a diameter of a CD. By way of example, the setting for modular teeth can be used as a setting for the X-ray apparatus.

In the next step, the imaging plate is read and a digital image is generated (S2). The dose with which the imaging plate was exposed can be determined after or during the reading. An output to the operator can be effected regarding whether the dose was chosen to be too high or too low. If appropriate, the operator must expose the imaging plate once again since the signal-to-noise ratio can change with the dose.

The next step involves preprocessing the image for ascertaining the quality of the imaging plate (S3). The step of preprocessing (S3) is explained in detail below.

After preprocessing (S3), two method blocks can be processed simultaneously in parallel, successively or/and as an alternative to one another.

The preprocessed image can be transformed into a mask in which pixels are marked for which a signal-to-noise ratio lies below a specific threshold value (S4). Alternatively or additionally, an edge recognition can be carried out on the preprocessed image (S5), on the basis of which edge recognition a mask can be generated in which the pixels thus recognized are marked.

By means of these two masks, a total number of marked pixels can be ascertained (S6). If this number of marked pixels is related to the total number of all pixels (reduced by the number of pixels of the exclusion mask) by a ratio, the quality of the imaging plate can be ascertained on the basis of this ratio (S7).

Figure 2:
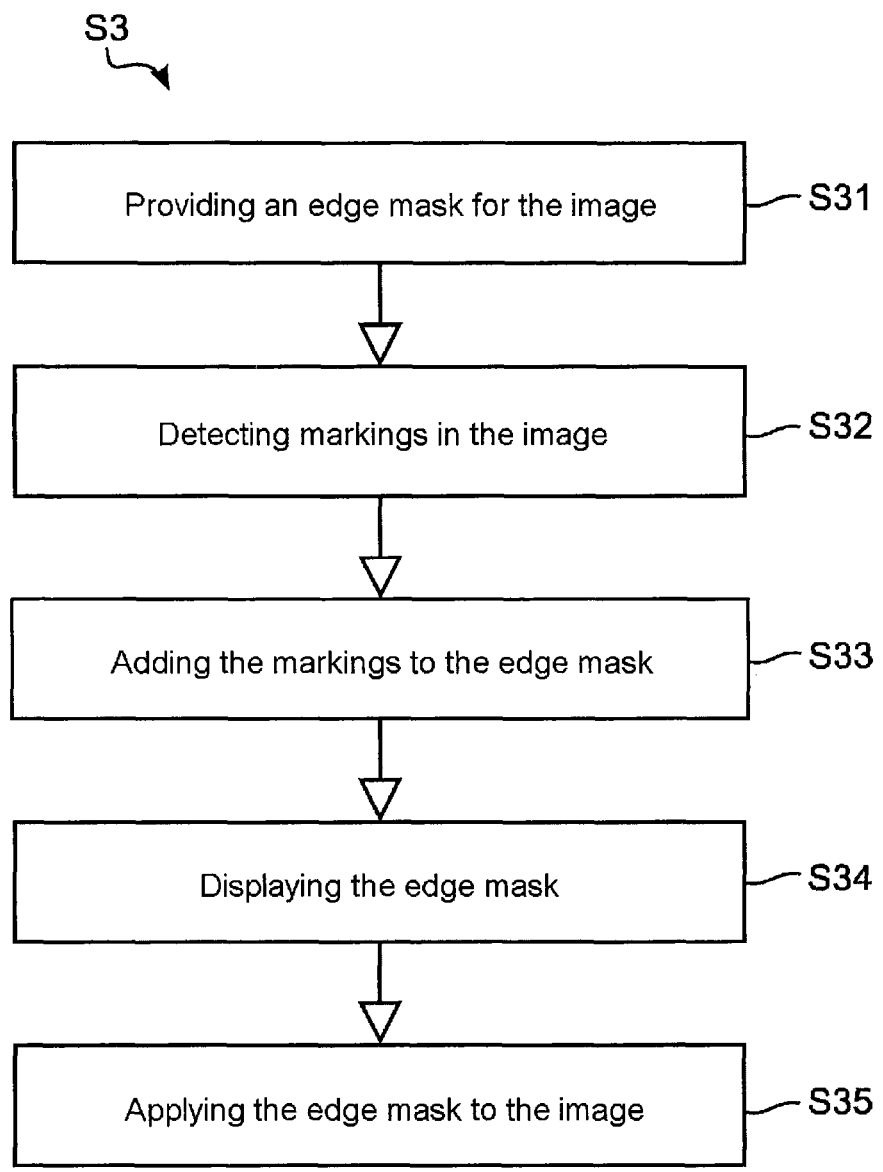
FIG. 2 shows a first development of the method from FIG. 1 in a flow diagram.

The preprocessing (S3) of the image obtained from the reading process is discussed in greater detail below. FIG. 2 shows one possible embodiment of the process of preprocessing (S3). An edge mask is provided for the image read out (S31). The edge mask can involve for example a distance which extends peripherally around the edge of the image and outside which the image data are discarded or not used for processing. In the case of the conventional sizes for imaging plates for the oral region (from 2×3 cm to approximately 6×8 cm), for example, one to two millimeters that should remain free as a peripheral edge suffice. Said distance can be fixedly set or freely selectable by the operator.

A further step involves detecting possible markings which are applied on the imaging plate and do not belong to the actual image content (S32). The detecting can be carried out by means of a morphological operation, for example, and can search for known structures in the image content, for example. Recognized markings or similar structures are added to the edge mask, which thus becomes an exclusion mask (S33).

Optionally, the edge or exclusion mask thus created can be displayed to an operator for control or/and for information purposes (S34).

The exclusion mask or edge mask thus created is applied to the image read out (S35), thus resulting in a preprocessed image. The latter is taken as a basis for one of the next steps (S4, S5).

Figure 3:
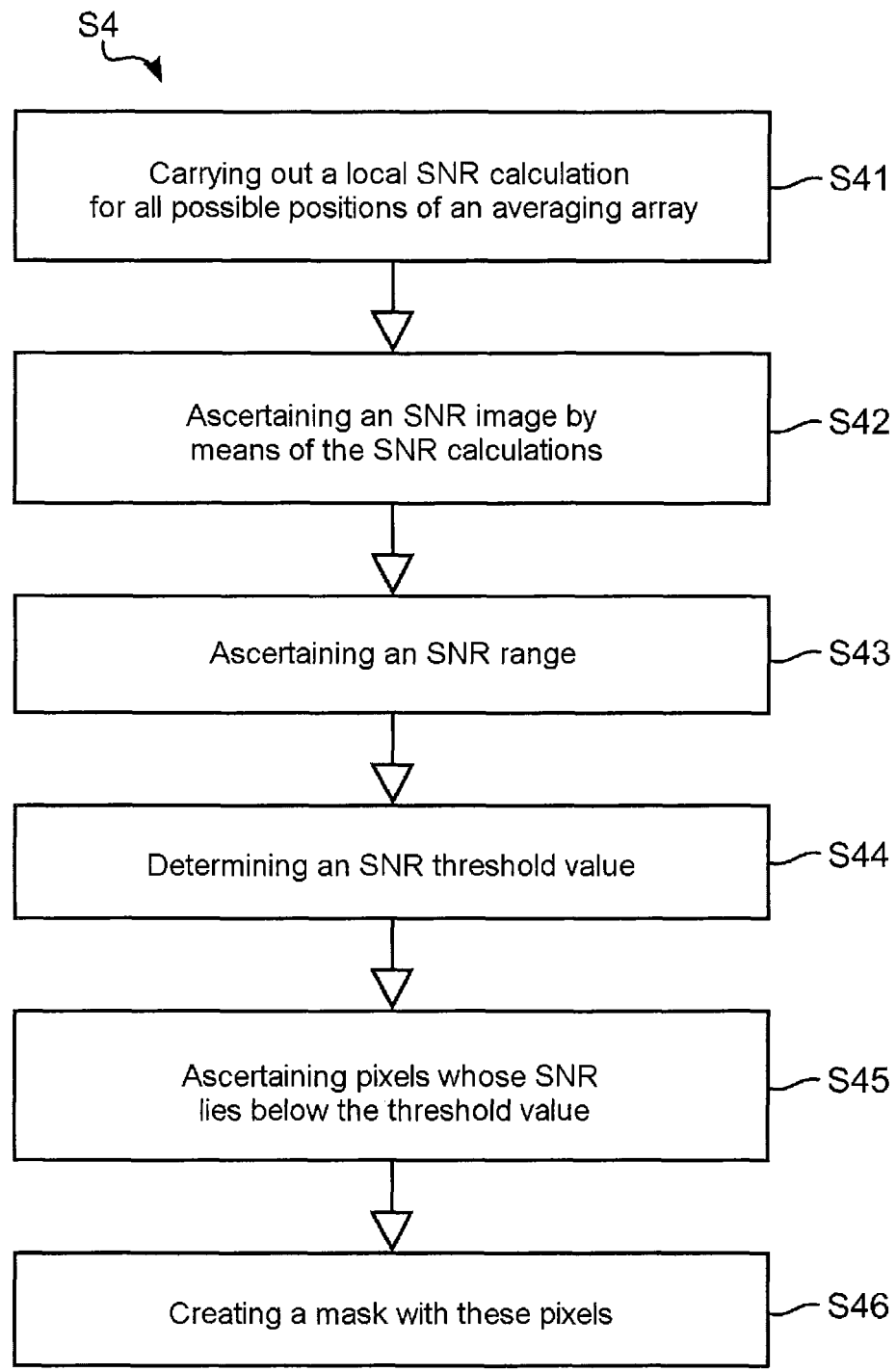
FIG. 3 shows a second embodiment of the method from FIG. 1 in a flow diagram.

FIG. 3 illustrates, in a flow diagram, some aspects of one embodiment of a method for determining a number of no longer operable pixels of an imaging plate by means of a calculation of a signal-to-noise ratio (S4). The method (S4) comprises firstly carrying out (S41) a local signal-to-noise ratio (SNR). In this case, an averaging array is defined, within which the SNR is determined as a value for all pixels contained therein. The value thus determined is correspondingly assigned to one of the pixels contained therein. This calculation step is carried out at all positions that are possible in the image. The averaging array is advanced as it were pixel by pixel and a local SNR is calculated in each case at the new location. An SNR thus results for virtually every pixel in the image (with the exception of an edge strip corresponding to the chosen size of the averaging array). These values can be interpreted and represented as an SNR image of the preprocessed image (S42). In practice, in the case of the imaging plate sizes mentioned and the corresponding image sizes, an averaging array of 21×21 pixels has proved to be expedient. Other averaging array sizes are also conceivable, having for example only half the magnitude or double the magnitude.

In a further step (S43), an SNR range is determined as an additional variable (S43). In this case, the local SNR values can be used for the calculation of the SNR range. By way of example, a minimum value and a maximum value can be determined. Alternatively, a global SNR value can be calculated from the local SNR values or solely on the basis of the preprocessed image.

A further step (S44) involves determining an SNR threshold value. The latter can be oriented toward the SNR range. Alternatively or additionally, a local SNR values can influence the ascertainment of the SNR threshold value. The SNR threshold value can be calculated for example as follows:

$$\frac{SNR_{local}(x, y) - SNR_{min}}{SNR_{max} - SNR_{min}},$$

wherein $SNR_{local}(x, y)$ represents the local SNR value, $SNR_{min}$ represents the minimum SNR value and $SNR_{max}$ represents the maximum SNR value. If this value is 20% or less, the corresponding pixel is marked as defective. However, other percentage values such as 10% or 30%, for example, are also conceivable.

By means of the SNR threshold value thus ascertained, it is then possible to determine the pixels in the SNR image whose SNR lies below the SNR threshold value (S45).

In a further step (S46), the pixels thus marked are combined to form a mask which marks the no longer operable region of the imaging plate—determined on the basis of the SNR.

Figure 4:
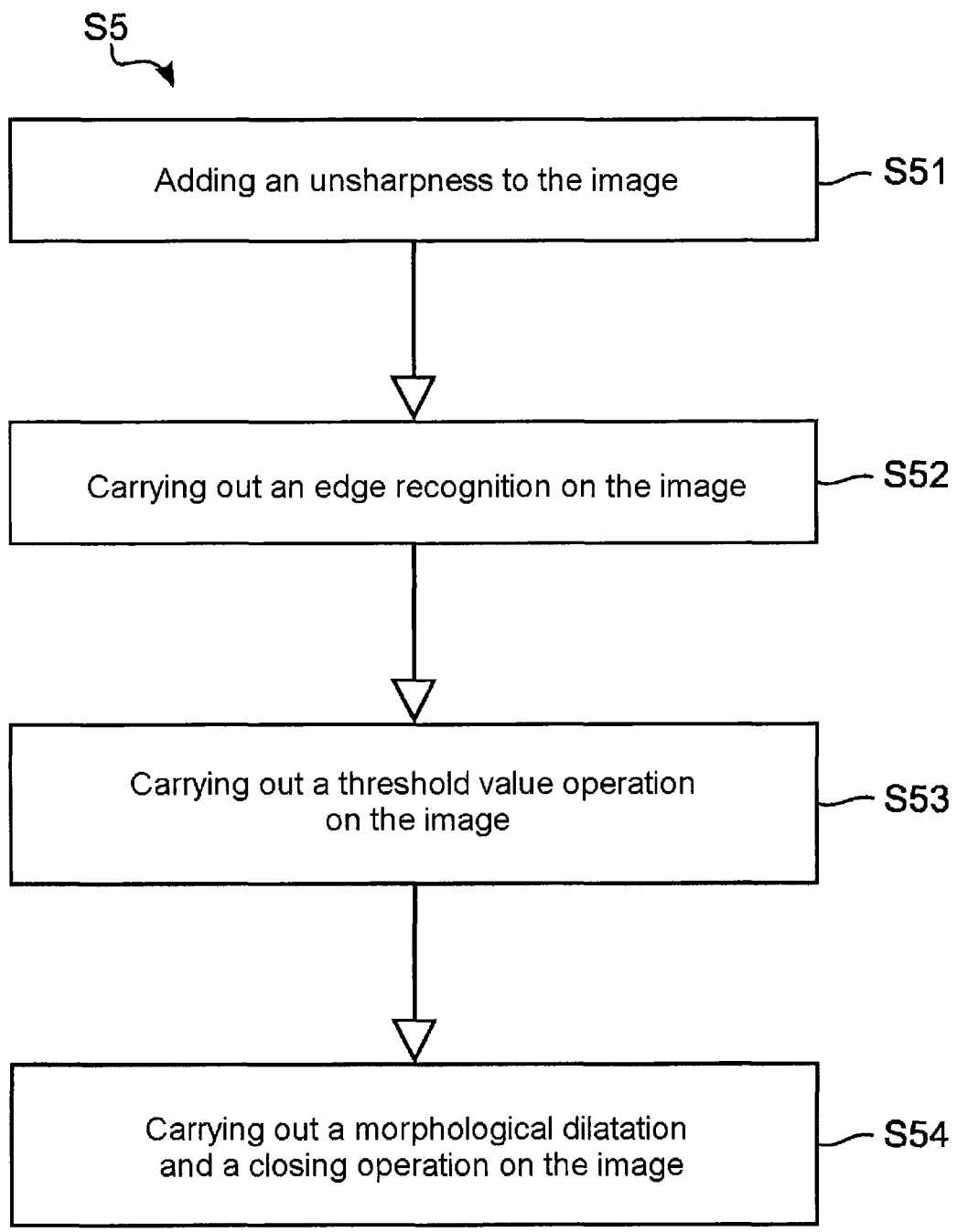
FIG. 4 shows a second alternative or additional embodiment of the method from FIG. 3 in a flow diagram.

FIG. 4 illustrates, in a flow diagram, an alternative embodiment of a method (S5) for ascertaining no longer functional regions of an imaging plate on the basis of an edge recognition method. This embodiment can be used simultaneously with or as an alternative to the method which provides for determining the signal-to-noise ratio.

A first step involves adding an unsharpness to the preprocessed image (S51). Adding the unsharpness serves the purpose of avoiding an excessively great reaction of the edge recognition algorithm to individual greatly noisy pixels.

An edge recognition is then carried out (S52) on the image that has been preprocessed in this way. By way of example, the Canny algorithm can be used in this case. However, other edge recognition algorithms are also conceivable. The result of the edge recognition algorithm is once again an image, which is converted into a binary image (only 0 or 1 exist as image values) by means of a threshold value operation (S53). The choice of the threshold value depends for example on the general image quality, the noise level, the quality of the reading process, etc.

On the edge recognition image that has been converted in this way, for better visibility of the detected structures, a morphological dilatation and a closing operation can be carried out in order to fill small gaps or holes in the edges (S54). This results in a second mask, which likewise marks regions in the image and thus indirectly the imaging plate which no longer function properly.

The image masks thus generated in two different ways can be combined with one another by means of a logic OR operation, for example. The obtained number of instances of damage in the form of no longer functional pixels can be converted—as has already been explained thoroughly further above—into a rating of the imaging plate in accordance with the formulae $$f_{marked} = -\ln \frac{N_{marked}}{N_{total} - N_{Mask}}$$

and $$f_{final} = w_0 + w_1 f_{marked}.$$

The weighting factors $w_0$ and $w_1$ can be used for adapting the quality checking method to the desired scaling of the quality classification of the respective imaging plate and can be determined for example by means of a linear regression on a training dataset such that the resulting final value corresponds to an expert rating of the plate quality as well as possible.

In a comparison of the quality classification by means of the method presented above and the classification results of experts (dentists, technicians), an extensive correlation of the two classifications was found.

Figure 5:
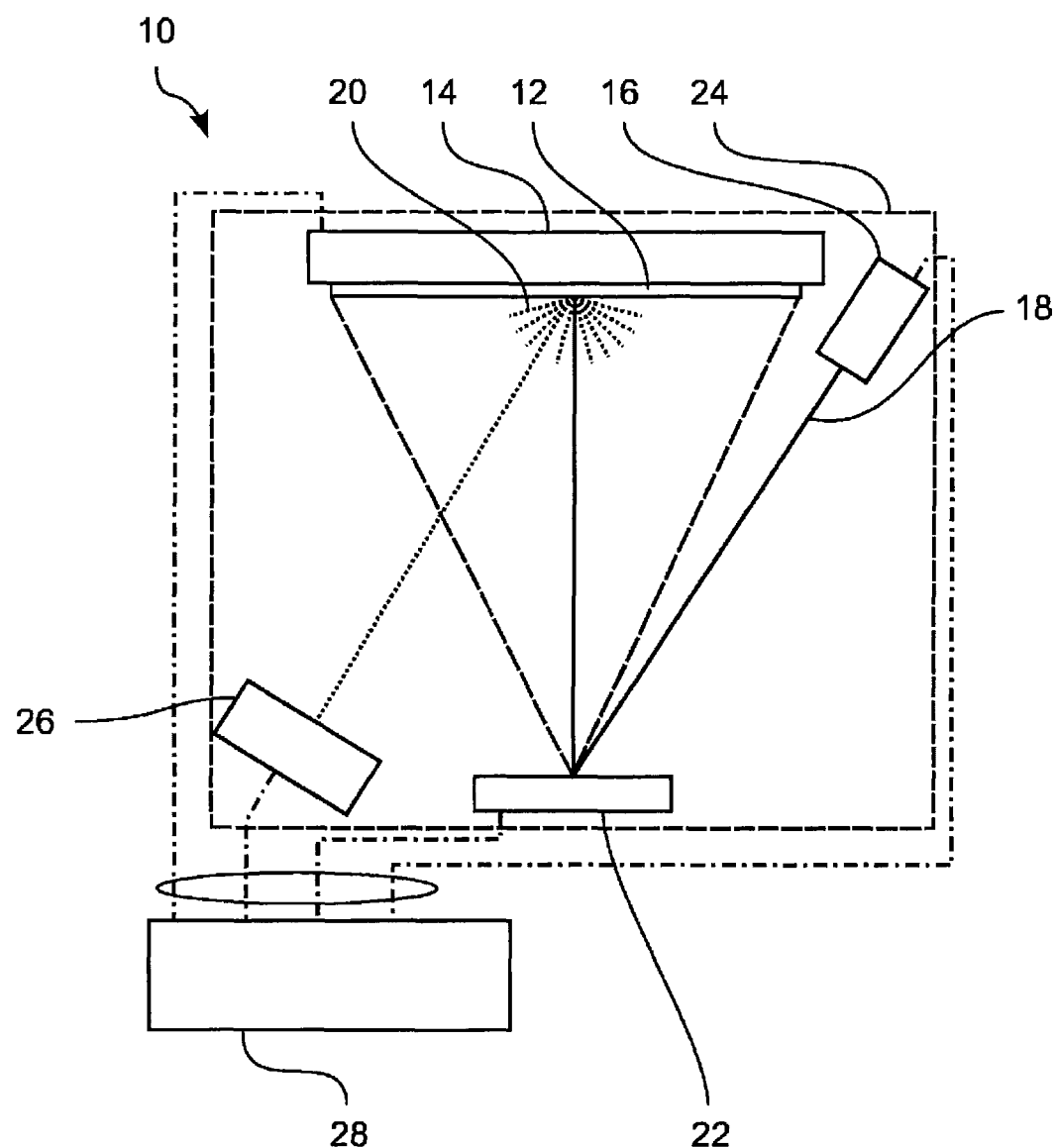
FIG. 5 shows an imaging plate scanner according to the invention in a schematic illustration.

FIG. 5 shows a scanning device 10 for reading an imaging plate 12 carrying a latent X-ray image in the form of metastable storage centers excited by X-ray radiation. The scanning device 10 comprises a supporting device 14 for the imaging plate 12. By way of example, the imaging plate 12 can be secured on the supporting device 14 by means of reduced pressure such that the imaging plate 12, which is generally flexible, nestles against the supporting surface 14 in a planar manner. The scanning device 10 furthermore comprises a laser 16 as read-out light source, said laser generating a read-out light beam 18 having a wavelength in the red, by means of which beam the metastable storage centers of the imaging plate 12 can be excited to produce fluorescent light. Said fluorescent light 20 is typically in the blue.

In the present embodiment of the scanning device 10, the laser 16 is arranged such that it directs the read-out light beam 18 onto a controllable deflection unit. The controllable deflection unit is embodied as a mirror 22 in the present case. Other deflection units such as, for instance, optical units or the like are also conceivable. The mirror 22 can be embodied as a micromirror, in particular as a MEMS component, and thus enable the surface of the imaging plate 12 to be scanned without or with only little relative movement between mirror 22 and supporting device 14. Alternatively, the mirror 22 can also be provided as a rotary mirror for a drum scanner. In this case, a relative movement between the supporting device 14 and the mirror 22 is realized by means of a transport device (not depicted). A further technique for reading the imaging plate 12 comprises the use of a rotary pentaprism.

The scanning device 10 can furthermore comprise a reflector 24, which is indicated by dashed lines in the drawing and which encloses the entire measurement space around the imaging plate 12 in a light-tight fashion, such that the fluorescent light 20 emanating from the imaging plate 12 is reflected to a photodetector 26. In order to prevent stray read-out light 18 from passing into the detector 26, suitable measures such as a dichroic filter material, for instance, can be provided. For controlling the reading process, the scanning device 10 comprises a control unit 28, which can also perform evaluation or correction functions besides the control function. In the embodiment shown in the present case, the control unit 28 is configured to carry out one of the abovementioned methods for determining the quality of an imaging plate.

The invention claimed is:

1. A method for determining quality of an imaging plate, the method comprising:
   carrying out an exposure of the imaging plate;
   carrying out a scan of the imaging plate in order to determine an image;
   removing markings from the image to generate a preprocessed image;
   determining a local signal-to-noise ratio for each pixel of a plurality of pixels of the preprocessed image using an associated averaging array comprising a local subset of the plurality of pixels;
   marking a first subset of the plurality of pixels for which their local signal-to-noise ratios are below a threshold value;
   carrying out an edge recognition on the preprocessed image;
   marking a second subset of the plurality of pixels corresponding to recognized edges; and
   calculating a quality value of the imaging plate using a ratio of the first and second subsets of marked pixels to the plurality of pixels of the preprocessed image.

2. The method of claim 1, wherein the carrying out the exposure comprises setting a specific distance between the imaging plate and a recording device.

3. The method of claim 1, further comprising generating a first image mask that marks the first subset of the pixels and generating a second image mask that marks the second subset of the pixels.

4. The method of claim 3, wherein the calculating comprises performing a logic OR operation on the first and second subsets of marked pixels to provide a combined set of the first and second subsets of marked pixels used to determine the ratio.

5. The method of claim 1, further comprising ascertaining damage of the imaging plate on the basis of the local signal-to-noise ratios.

6. The method of claim 1, further comprising ascertaining damage of the imaging plate on the basis of the recognized edges.

7. The method of claim 1, wherein the carrying out the edge recognition comprises using a Canny algorithm.

8. The method of claim 1, further comprising, after carrying out the edge recognition, performing a morphological dilatation.

9. The method of claim 1, wherein the determining the local signal-to-noise ratio for each pixel of the preprocessed image comprises:
   defining the associated averaging array;
   determining the local signal-to-noise ratio using all of the pixels contained in the associated averaging array; and
   assigning the local signal-to-noise ratio to one of the pixels contained in the associated averaging array.

10. The method of claim 1, further comprising, after carrying out the edge recognition, performing a closing operation.

11. An imaging plate scanner configured to perform operations, comprising:
   carrying out an exposure of an imaging plate;
   carrying out a scan of the imaging plate to determine an image;
   removing markings from the image to generate a preprocessed image;
   determining a local signal-to-noise ratio for each pixel of a plurality of pixels of the preprocessed image using an associated averaging array comprising a local subset of the plurality of pixels;
   marking a first subset of the plurality of pixels for which their local signal-to-noise ratios are below a threshold value;
   carrying out an edge recognition on the preprocessed image;
   marking a second subset of the plurality of pixels corresponding to recognized edges; and
   calculating a quality value of the imaging plate using a ratio of the first and second sets of marked pixels to the plurality of pixels of the preprocessed image.

12. The imaging plate scanner of claim 11, wherein the carrying out the exposure comprises setting a specific distance between the imaging plate and a recording device.

13. The imaging plate scanner of claim 11, wherein the operations further comprise generating a first image mask that marks the first subset of the pixels and generating a second image mask that marks the second subset of the pixels.

14. The imaging plate scanner of claim 13, wherein the calculating comprises performing a logic OR operation on the first and second subsets of marked pixels to provide a combined set of the first and second subsets of marked pixels used to determine the ratio.

15. The imaging plate scanner of claim 11, wherein the operations further comprise ascertaining damage of the imaging plate on the basis of the local signal-to-noise ratios.

16. The imaging plate scanner of claim 11, wherein the operations further comprise ascertaining damage of the imaging plate on the basis of the recognized edges.

17. The imaging plate scanner of claim 11, wherein the carrying out the edge recognition comprises using a Canny algorithm.

18. The imaging plate scanner of claim 11, wherein the operations further comprise, after carrying out the edge recognition, performing a morphological dilatation.

19. The imaging plate scanner of claim 11, wherein the operations further comprise, after carrying out the edge recognition, performing a closing operation.

20. The imaging plate scanner of claim 11, wherein the determining the local signal-to-noise ratio for each pixel of the preprocessed image comprises:
   defining the associated averaging array;
   determining the local signal-to-noise ratio using all of the pixels contained in the associated averaging array; and
   assigning the local signal-to-noise ratio to one of the pixels contained in the associated averaging array.

* * * * *